Oct. 21, 1969 R. N. JAMES 3,473,769

RETAINER FOR FLEXIBLE LEADS

Filed Jan. 6, 1967

*INVENTOR.*
RICHARD N. JAMES

BY *Robert B. Crouch*
ATTORNEY

United States Patent Office 3,473,769
Patented Oct. 21, 1969

3,473,769
RETAINER FOR FLEXIBLE LEADS
Richard N. James, San Jose, Calif., assignor to International Business Machines Corporation, Armonk, N.Y., a corporation of New York
Filed Jan. 6, 1967, Ser. No. 607,798
Int. Cl. F16l *3/22;* F16g *13/00;* H02g *11/00*
U.S. Cl. 248—69                    2 Claims

ABSTRACT OF THE DISCLOSURE

The present invention relates to a retainer for flexible leads and more particularly to means for supporting and guiding leads such as wires, cables, hoses, etc., between two members capable of relative motion. The retainer includes a backing strip and a series of spaced retaining clips thereon. The strip is bent back on itself to form a self-supporting arch and secured between the two members. The clips can be opened to permit placement of the leads and then closed to retain the leads in position.

BACKGROUND

In supporting flexible wires or cables from one location to another, various devices have been provided for retaining and protecting the wires. These devices such as wiring grilles, raceways, conduits, etc., have been directed toward supporting the wires between fixed locations, but have not been suitable for use in the situation where one location is movable relative to another, and especially where the movement is in two directions from a home position. Up to the present time, wiring connections between a fixed member and a movable object have usually involved coiled, extendable cords, cables attached to a mechanical retractor to support, guide and retract the cables, or special cable constructions such as those employing a metal tape support. The metal tape type constructions have taken a variety of forms, for instance, in one case the leads are bonded directly to the metal tape, in another case the leads are embedded in a plastic ribbon which is then clamped to the tape, and in a third case, the leads are positioned on either side of the tape and then the entire assembly embedded in a protective covering of insulation. These various constructions employ a fixed configuration which exhibits ready replacement or addition of individual leads and either prevent, or allow only with excessive space requirements, the moving member to move in two directions from a home position. Furthermore, these constructions are limited to electrical connectors and do not lend themselves to supporting different types of leads, for instance, pneumatic or hydraulic hoses or the mixing of electrical and other type leads.

SUMMARY

The limitations of the prior art devices are avoided in the present invention by a provision of a retainer for flexible leads which is adapted to support various types of leads between relatively movable members and which permits easy replacement, addition or withdrawal of any individual lead in the retainer. This is accomplished in the present invention by provision of a backing strip which is rigid in a first plane and has limited flexibility in a second plane normal to the first. The backing strip is bent back upon itself in the second plane to form a self-supporting arch and the opposite ends of the strip are secured between two relatively movable members. The leads are retained in position adjacent the interior surface of the strip by means of spaced clips which extend from the edges of the strip and form closed loops across the width of the strip. Provision is made for opening the loops to facilitate ease of placement or removal of one or more of the leads as desired.

The foregoing and other objects, features and advantages of the invention will be apparent from the following more particular description of a preferred embodiment of the invention as illustrated in the accompanying drawing.

Figure 1:
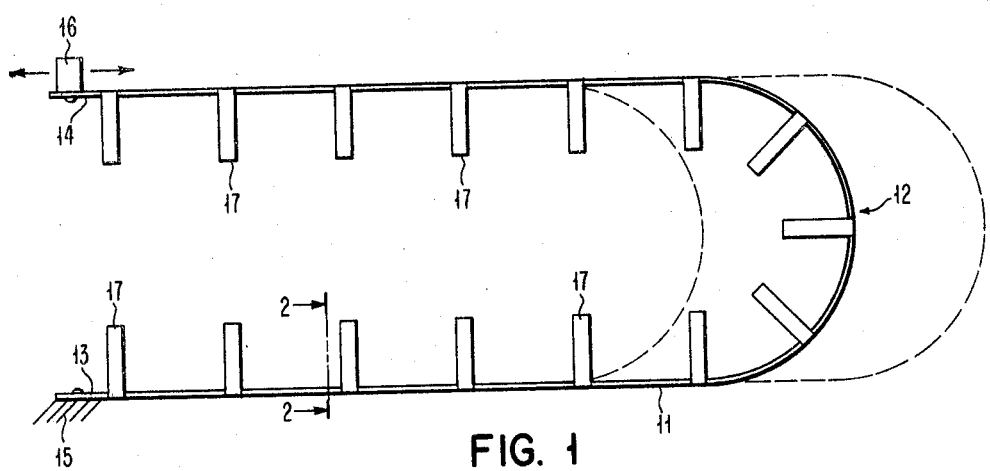
FIG. 1 is a side view of the present invention as connected between relatively movable members.

As shown in FIG. 1 the retainer of the present invention includes a backing strip 11 which is bent back upon itself to form a self-supporting arch 12, the opposite ends 13 and 14 of the strip being secured to a fixed member 15 and a movable member 16 respectively. A series of lead-retaining clips 17 are spaced along the length of the strip.

Figure 2:
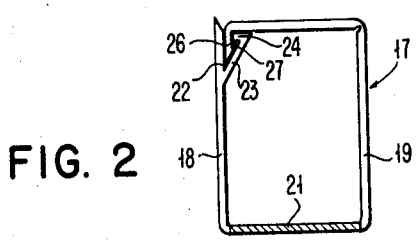
FIG. 2 is an elevation view at an enlarged scale taken along lines 2—2 of FIG. 1, and FIGS. 3 through 6 are perspective views showing various stages of manufacture and assembly of the present invention.

Referring to FIG. 2 of the drawing, each clip 17 consists of a pair of arms 18 and 19 extending from the opposite edges of the backing strip at approximately 90 degrees to the inner surface 21 of the strip. A locking recess 22 is provided adjacent the free end of arm 18. The recess is defined by a finger 23 protruding inwardly from the arm 18, the free end of finger 23 being provided with an inturned lip 24. The remaining arm 19 of each pair is somewhat longer than the arm 18 and is provided at its distal end with a locking tab 25 which includes a shoulder 26 and a beveled face 27. The free end of arm 19 extends generally parallel to the backing strip 11 with the locking tab 25 received within the locking recess 22. The tab 25 is retained within the recess 22 by means of inturned lip 24 bearing against shoulder 26.

Figure 3:
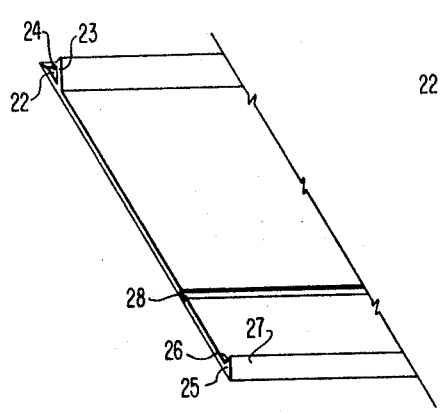
Figure 4:
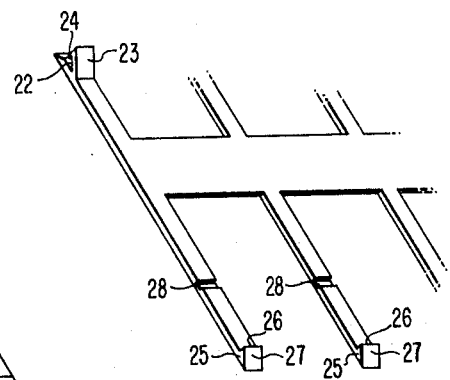
Figure 5:
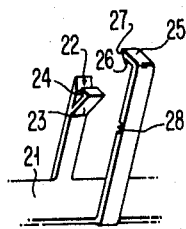
Figure 6:
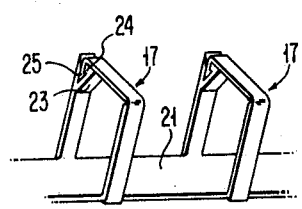

The retainer of the present invention is made of a light, strong material having sufficient rigidity to resist distortion in the plane of the backing strip and sufficient flexibility and elasticity in the plane normal to the backing strip to form the self-supporting arch 12. Examples of materials which are suitable for use in the present invention are polyvinyl chloride, and poly-carbonate; however, any thermoplastic material having the above characteristics would be satisfactory. As illustrated in FIGS. 3 through 6 the retainer of the present invention is manufactured by well known manufacturing techniques. In the first step of the manufacturing operation an elongated flat blank is extruded having a locking recess 22 formed at one lateral edge and a locking tab 25 at the other lateral edge. A reduced section 28 is spaced inwardly from the locking tab as shown in FIG. 3. The blank is then subjected to a stamping process to define the backing strip and the spaced pairs of arms. The stamped blank is then bent to a generally U-shaped configuration by a heat-forming process. In this step heat is applied to the stamped blank, the arms are bent at right angles to the backing strip and the locking tab bent at right angles to its arm. At this point the retainer is ready for installation.

An advantage that is derived from the use of plastic material is the savings in cost involved in the extrusion and stamping steps. The use of a flat, sheet-like extruded blank permits formation of the arms by removal of excess material through conventional stamping techniques. In a single operation the arms and backing strip are defined, the retainer trimmed to the desired length and attachment holes punched at the specific locations. The retainer can then be heat formed or cold worked, depending upon the material, to the shape shown in FIG. 5.

In the operation of the present invention the retainer is bent back upon itself as shown in FIG. 1 to form a self-supporting arch. The opposite ends of the retainer are then secured to a fixed point 15 and a movable point 16 or between two movable points. In a given situation the fixed point may be the main frame of a machine and the movable point may be a drawer or carriage containing electrical or fluid operated gear. The retainer is installed while it is in the shape illustrated in FIG. 5, the ends of the backing strip being secured to the respective points by any suitable means, such as screws, rivets, etc. After the retainer is in position the individual leads are placed on the inner surface 21 of the backing strip between the arms of each clip. When all of the leads are in place the free end of the longer arm of each pair is bent toward the shorter arm about the reduced section 28 and the locking tabs snapped into place within the locking recess. The reduced section on the longer arm defines the bend line and also serves as a hinge to permit easy deflection of the free end of the arm. The beveled face of the locking tab deflects the inturned lip 24 of the finger 23 to permit entry of the tab into the locking recess. When the tab is in the position shown in FIG. 2 the inturned lip moves off the beveled face and overlies the shoulder of the tab, thus locking the tab within the recess. In this position the clip and the backing strip form a closed loop to retain the leads in position. When the individual clips are locked, the various leads are held in position without the need of lacing or any other retaining means. Whether the retainer is installed in position on the machine before or after the leads are put in place in the retainer is a matter of choice, depending upon the application. If it is necessary to replace a lead or add an additional lead to the assembly, the individual clips may be opened by displacing the locking tab and locking recess in opposite directions toward adjacent clips. The inherent flexibility of the material will permit the arms of each clip to be deflected far enough to free the locking tab without permanently distorting the clip. After the lead has been placed within the clip the locking tab is then again snapped into the locking recess. When the retainer and the leads are assembled on the machine the self-supporting arch forms a travelling loop, indicated in dotted line position in FIG. 1 as the movable member 16 is displaced relative to the point 15.

The length of the retaining strip and the spacing between the clips will depend to some extent upon the individual application of the device. The extent of movement of the movable point relative to the fixed point will determine the length of the retainer while the spacing between adjacent clips is influenced by various considerations, such as the degree of flexibility of the leads, the vertical spacing between the fixed point and the movable point, etc. While the leads rest on the backing strip of the lower half of the assembled strip, they are supported by the clips over the upper half of the assembly. Thus some minimum spacing between clips is necessary to prevent drooping of very flexible leads. In this regard the spacing between adjacent clips limits the radius of curvature of the self-supporting arch. When the retainer is bent upon itself the free ends of the clips are brought closer together and when they touch they form an effective stop to limit the size of the arch.

In its assembled condition the opposite ends of the strip are secured in a common plane. The travelling loop then moves in this plane. It may be desirable in some applications to confine the travelling loop in this plane by placement of the retainer in shallow, channel-like guides attached to the two relatively movable members.

What is claimed is:

1. A retainer for supporting flexible leads between two relatively movable points and which confines the leads to bidirectional movement within a single plane comprising:

a thin elongated strip having generally flat upper and lower surfaces, the strip being rigid in the plane of the surfaces and having limited flexibility in a plane normal to the surface, said strip having a self-supporting arch forming a loop for travel in said normal plane;

lead retaining clips protruding from the upper surface at intervals over the length of the strip;

each clip including a first arm and a second arm, said second arm having lower and upper section;

said upper and lower section being joined about a reduced section of said second arm so as to provide hinging motion for said upper section;

locking means for coupling said first arm of each clip to said upper section of said second arm of each clip;

said locking means including a recessed member formed on the distal end of said first arm having a finger member with an inturned lip, and a tab member at the distal end of said upper portion of said second arm having a shoulder and a beveled face so as to provide sure entry into said recessed member.

2. A retainer as defined in claim 1 wherein said locking means further includes a beveled locking back member at the distal end of said first arm so as to guide said tab member into a locking position.

References Cited

UNITED STATES PATENTS

| | | | |
|---|---|---|---|
| 2,684,512 | 7/1954 | Beman | 248—68 |
| 2,959,634 | 11/1960 | Lyon | 174—69 X |
| 3,082,984 | 3/1963 | Larsson | 174—72 X |
| 3,205,897 | 9/1965 | Jamison | 24—201 X |
| 3,330,105 | 7/1967 | Weber | 59—78.1 |

FOREIGN PATENTS

| | | |
|---|---|---|
| 1,352,504 | 1/1964 | France. |
| 581,139 | 8/1958 | Italy. |
| 732,501 | 6/1955 | Great Britain. |

CHANCELLOR E. HARRIS, Primary Examiner

U.S. Cl. X.R.

59—78.1; 174—68; 191—12